United States Patent [19]

Demiryont

[11] Patent Number: 5,111,328
[45] Date of Patent: May 5, 1992

[54] ELECTROMAGNETIC RADIATION MODULATING DEVICE

[75] Inventor: Hulya Demiryont, Farmington Hills, Mich.

[73] Assignee: Ford Motor Company, Dearborn, Mich.

[21] Appl. No.: 626,498

[22] Filed: Dec. 12, 1990

[51] Int. Cl.$^5$ .......................... G02F 1/15; G02F 1/153
[52] U.S. Cl. .................................. 359/265; 359/270; 359/272; 359/273; 359/274; 359/275
[58] Field of Search ................ 350/356, 357; 359/265, 359/269, 270, 272, 273, 274, 275

[56] References Cited

U.S. PATENT DOCUMENTS

| | | | |
|---|---|---|---|
| 4,256,379 | 3/1981 | Green | 350/357 |
| 4,335,938 | 6/1982 | Giglia et al. | 350/357 |
| 4,338,000 | 7/1982 | Kamimori et al. | 350/357 |

FOREIGN PATENT DOCUMENTS 8912844 12/1989 PCT Int'l Appl. ................ 350/357

Primary Examiner—Eugene R. Laroche
Assistant Examiner—Evelyn A. Lester
Attorney, Agent, or Firm—Charles H. Ellerbrock; Roger L. May

[57] ABSTRACT

A electromagnetic radiation modulating laminate comprises consecutively a conductive substrate, a persistent first metal layer, a fast ion conductor layer containing cations of a second metal, a transition metal compound ion storage layer, and an electrode. The transmission and reflection of electromagnetic radiation is modulated by the reversible dissolution and re-deposition of at least a part of the persistent first metal layer into and out from the fast ion conductor layer, upon the application of a reversible electrical potential across the conductive substrate and the electrode.

24 Claims, No Drawings ized, such as
ELECTROMAGNETIC RADIATION MODULATING DEVICE

FIELD OF THE INVENTION

The present invention relates generally to a device for modulating the transmission and reflection of electromagnetic radiation. More particularly, the invention is directed to such a device comprising, inter alia, a discrete, persistent layer of electromagnetic radiation reflecting metal, a transition metal compound ion storage layer, and a fast ion conductor in electrical communication therebetween.

BACKGROUND OF THE INVENTION

Generally, in a multi-layered device for modulating electromagnetic radiation employing an electrochromic material, a physical/chemical change is produced within the electrochromic layer in response to electron or ion transfer caused by an externally applied electrical potential. This change results in modulation of the reflectivity and transmissivity of the device with respect to electromagnetic radiation directed thereagainst. Such devices generally comprise consecutive layers of electrochromic material, an electrolyte-containing fast ion conductor, and a counterelectrode. The exchange of ions between the electrochromic and fast ion conductor layers, when an electrical potential is applied across the device, comprises the mechanism by which the electrochromic layer becomes either bleached (substantially transparent, either lightly colored or colorless) or opaque. By reversing the polarity of the electrical potential applied across the device, it may be "switched" between the bleached and opaque states. Depending upon the magnitude and duration of the applied electrical potential, an intermediate, generally colored, translucent state may be induced, wherein the electrochromic layer contains a concentration of ions sufficient only to reduce the transmissivity of the device but not make it completely opaque to electro-magnetic radiation. Thus, depending upon the manner in which the device is operated, i.e., the polarity, magnitude, and duration of the voltage applied, it may be adjusted to have an electromagnetic radiation transmissivity from 0% to greater than about 90%, with an inversely corresponding reflectivity.

In typical electromagnetic radiation modulating devices, the electrochromic layer comprises an inorganic metal oxide, most commonly a transition metal oxide such as, for example, tungsten oxide. The electrolyte-containing fast ion conductor layer adjacent the electrochromic layer is generally adapted to provide a positively charged light cation such as, for example, a lithium ion. As an example of the operation of a typical electrochromic device, when lithium ions are introduced into a tungsten oxide electrochromic layer, the layer changes from a colorless transparent state to a dark blue-black color; where the tungsten oxide electrochromic layer is sufficiently thick, the induced coloration causes the tungsten oxide electrochromic layer to become opaque to electromagnetic radiation, e.g., the visible portion of the electromagnetic spectrum.

The electrolyte-containing fast ion conductor layer may be a liquid electrolyte solution such as, for example, lithium perchlorate in propylene carbonate; a gel such as, for example, a solution of methanol in polyvinyl butyral doped with lithium chloride; or a solid such as, for example, porous silicon dioxide doped with lithium salts.

Counterelectrodes are generally prepared from a transition metal oxide such as, for example, vanadium oxide or tungsten oxide, or an electroconductive polymer such as, for example, polypyrrole or polythiophene.

In those electrochromic devices generally known in the prior art and discussed hereinabove, the electrochromic layer is the medium which provides the variation in electromagnetic radiation transmissivity and reflectivity; the electrolyte fast ion conductor and counterelectrode layers generally being transparent.

U.S. patent application Ser. No. 07/338,261 to Demiryont discloses an electrochromic device, comprising first and second spaced-apart transparent electrodes and an electrochromic matrix material layer therebetween. The matrix layer comprises a substantially uniform mixture of: a metal salt such as, for example, copper chloride; an ion conductive enhancer such as, for example, lithium nitrate; and an ion conductive material such as, for example, polyvinyl butyral gel. Although the electrodes are transparent, the electrochromic device appears light yellow in transmitted color due to the color of the metal salt which is in solution in the matrix layer. When an electrical potential is applied across the electrodes, the metal atoms of the metal salt plate onto the cathode while the metal salt anions migrate toward the anode. In this state, the electrochromic device may be opaque to electromagnetic radiation, depending upon the thickness of the metal layer formed at the cathode. The device, however, has what is known in the electrochromics art as a "short term memory." The matrix layer readily reverts to its initial state, i.e., the metal layer redissolves back into the matrix layer which takes on a light yellow color in transmitted light, when the electrical potential is removed from the electrochromic device. It is further disclosed that a counterelectrode may be interposed between the matrix layer and the anode. This counterelectrode minimizes the formation of a gas at the anode caused by the migration of anions toward the anode where they are oxidized, such as occurs when copper chloride is used as the metal salt resulting in the production of chlorine gas at the anode.

U.S. Pat. No. 4,256,379 to Green discloses an electrochromic device comprising consecutively: a first electrode such as, for example, tin oxide coated glass; a metal sensitive colorable electrochromic material such as, for example, tungsten oxide; a metal ion-containing fast ion conductor such as, for example, rubidium silver pentaiodide; and a second electrode such as, for example, silver. The metal ion of the fast ion conductor is effective to color the electrochromic material layer when injected therein. The second electrode must be formed from a material containing metal identical to the metal ions of the fast ion conductor. Thus, in a preferred embodiment, when an electrical potential is applied across the device, silver ions from a silver second electrode are injected into a rubidium silver pentaiodide fast ion conductor, while other silver ions from the fast ion conductor are injected into a tungsten oxide electrochromic material causing it to turn blue. It is disclosed that the second electrode can be very small, such as a Dag contact placed on the surface of the fast ion conductor layer (as opposed to a continuous film adhered to the fast ion conductor), and serves merely as a source of the fast metal ions. The second electrode does not participate in the modulation of the transmitted or reflected electromagnetic radiation.

It would be desirable to prepare an electromagnetic radiation modulating device, wherein modulation of the transmissivity and reflectivity of electromagnetic radiation could be precisely controlled over a wide range. Such a device would be particularly useful were it able to substantially reduce the transmission of infrared radiation as well as visible light rays. Thus, the device could be used to prevent the passage of heat energy therethrough, and would therefore be especially suited for use as an automotive or architectural glazing. Furthermore, the usefulness of such a device would be particularly enhanced were it able to maintain an established transmissivity or reflectivity after the removal of an electrical potential.

SUMMARY OF THE INVENTION

Accordant with the present invention, a device for modulating electromagnetic radiation such as, for example, infrared radiation and visible light rays has surprisingly been discovered. The inventive device is prepared from an electromagnetic radiation modulating laminate, comprising: a conductive substrate; a persistent first metal layer adhered to the conductive substrate; a fast ion conductor layer, containing fast ions of a second metal, adhered to the first metal layer; a transition metal compound ion storage layer adhered to the fast ion conductor layer; and an electrode adhered to the ion storage layer.

The transmission and reflection of electromagnetic radiation is modulated by the reversible dissolution and re-deposition of the first metal layer. As the first metal layer dissolves into the fast ion conductor layer, upon the application of an appropriate electrical potential, the transmissivity of the laminate increases. Reversing the polarity of the electrical potential causes the metal to re-deposit to form the first metal layer.

The electromagnetic radiation modulating laminates of the present invention and their method of production are particularly useful for manufacturing solar control automotive and architectural glazings.

DETAILED DESCRIPTION OF THE PREFERRED EMBODIMENT

This invention is directed to a device for modulating the transmission and reflection of electromagnetic radiation. The device includes an electromagnetic radiation modulating laminate, comprising consecutively: a conductive substrate; a persistent first metal layer; a fast ion conductor layer, containing fast ions of a second metal; a transition metal compound ion storage layer, adapted to accept or reject the second metal fast ions; and an electrode, e.g., a second conductive substrate.

Depending upon the thickness of the first metal layer, the laminate will be partially or fully opaque to electromagnetic radiation; the conductive substrate, fast ion conductor layer, ion storage layer, and electrode typically being substantially transparent. Thus, the laminate may be constructed, by the proper selection of materials and thicknesses, to transmit or reflect a precise amount of electromagnetic radiation within a particular region of the electromagnetic energy spectrum. For example, it is known that a first layer of silver metal effectively reflects infrared radiation as well as visible light rays. Therefore, a particular thickness of silver metal, in combination with an appropriate conductive substrate, fast ion conductor layer, ion storage layer, and electrode will reflect a precise amount of infrared energy and simultaneously provide a particular shading coefficient for visible light rays transmitted therethrough. In this manner, automotive and architectural glazings may be customized for specific solar control properties.

When a voltage is applied across the inventive laminate, by applying a positive electrical potential to the conductive substrate and a negative electrical potential to the electrode, first metal layer atoms are converted into positively charged metal ions which migrate into the interface region of the fast ion conductor layer. Simultaneously, a proportionate number of second metal fast ions from the fast ion conductor layer migrate into the transition metal compound ion storage layer. The degree to which dissolution of the first metal layer into the fast ion conductor layer occurs is controlled by the length of time that the voltage is applied. Thus, the voltage may be applied for a long period of time such that the entire first metal layer dissolves into the fast ion conductor layer, or for a lesser period of time so that a portion of the first metal layer remains. When the electrical potential is reversed, the first metal layer redeposits from the fast ion conductor layer onto the conductive substrate. Conveniently, the first metal layer of the present invention is "persistent", meaning that it has the ability to remain, after removal of the electrical potential, in the electromagnetic radiation absorptive state to which it is changed by the application of an electrical potential across the laminate; as distinguished from a non-persistent layer which undergoes automatic reversal to its initial state when the electrical potential is removed. Thus, the transmissivity and reflectivity of the laminate of the present invention remains constant over time when the voltage is removed from the laminate.

The conductive substrate according to the present invention may be virtually any material which is known to be useful for conducting electrical energy and against which consecutive layers of metal, a fast ion conductor, a transition metal compound layer and an electrode may be adhered. Clearly, metals including, but not necessarily limited to, silver, gold, platinum, copper, aluminum, nickel, chromium, iron, tin, silicon, titanium, magnesium, tungsten, and zinc, as well as alloys and multiple layers thereof may be used as conductive substrates. Furthermore, such metals may be coated onto a support material at a thickness from about 20 Angstroms to several thousand Angstroms, to from a conductive substrate according to the present invention. Suitable support materials include, but are not necessarily limited to glass, quartz, and plastics such as polycarbonates, polyacrylics, polyesters, polystyrenics, celluosics, and the like, as well as copolymers and laminates thereof. These supports may be in the form of a transparent panel intended for use as an automotive or architectural glazing, a mirror, or a display device.

Alternatively, the conductive substrate may comprise a support material as listed hereinabove having a layer of a metal oxide on a surface thereof. Suitable metal oxides, which conveniently may be deposited in thicknesses from about 100 Angstroms to several thousand Angstroms, include but are not necessarily limited to tin oxide, indium oxide, indium- or fluorine-doped tin oxide, cadmium oxide, antimony oxide, zinc oxide, and the like, as well as mixtures and multiple layers thereof. A preferred conductive substrate comprises a glass support having a layer of fluorine-doped tin oxide from about 100 Angstroms to about 50,000 Angstroms thick thereon.

For the preparation of certain useful devices employing the electromagnetic radiation modulating laminates of the present invention such as, for example, a light valve, it is necessary that the conductive substrate be transparent. Such a transparent conductive substrate may comprise, for example, an electrically conductive metal or metal oxide layer on glass. The thickness of the metal or metal oxide layer must, of course, not be so great as to block the passage of visible light therethrough. Generally, the operable thickness ranges for transparent metal or metal oxide layers is from about 80 Angstroms to about 300 Angstroms for metal and about 1,000 to about 20,000 Angstroms for metal oxide, accompanied by a corresponding variance in transmissivity for the conductive substrate.

A preferred Conductive substrate, comprising metal or metal oxide coated glass, may be prepared by any conventional coating process generally known in the art such as, for example, vacuum evaporation, chemical vapor deposition, sol-gel deposition, spray pyrolysis ion plating, sputtering, etc. Methods for depositing metal and metal oxide coatings on glass are more fully set forth in Kirk-Othermer, "Concise Encyclopedia of Chemical Technology," John Wiley & Sons, Inc., 1985, pp. 477-478, which is incorporated herein by reference thereto.

A first metal layer is deposited directly onto and adhered to the conductive substrate by any of the conventional metal deposition processes such as, for example, vacuum evaporation from a metal source, chemical vapor deposition utilizing a metal-containing reactive precursor, sputtering from a metal target, etc. Metals having the same operability and utility include, but are not necessarily limited to, silver, gold, copper, nickel, chromium, tin, silicon, titanium, tungsten, lithium, and zinc, as well as alloys thereof. The first metal layer is deposited at a thickness which will result in an ultimately produced electromagnetic radiation modulating laminate having specific values for transmittance and reflectance. Such thicknesses may be determined by one ordinarily skilled in the art using no more than routine experimentation. Useful first metal layer thicknesses generally range from about 20 Angstroms to about 2,000 Angstroms, which result in electromagnetic radiation opacities up to 100%. Preferably, the first metal layer is from about 50 Angstroms to about 500 Angstroms thick.

A fast ion conducting layer is positioned adjacent and adhered to the first metal layer, and contains fast ions of a second metal. The fast ion conducting layer generally comprises an ion conductive material and an electrolyte.

The ion conductive material according to the present invention may be either a solid or a gel, and is a dielectric material which conducts ions but insulates against the movement of electrons. Of course, the ion conductive material must be ionically conductive for the first metal layer cations and the second metal fast ions supplied by the electrolyte. Generally, the ion conductive material would have an ionic conductivity of at least about $10^{-5}$ (ohm.cm)$^{-1}$ and a negligible electronic conductivity less than about $10^{-7}$ (ohm.cm)$^{-1}$.

Suitable solid ion conductive materials include, but are not necessarily limited to, silicon dioxide, tantalum oxide, niobium oxide, zirconium oxide, titanium dioxide, hafnium oxide, alumina, yttrium oxide, and lanthanum oxide, as well as mixtures thereof. These solid ion conductive materials may be produced by conventional deposition techniques such as, for example, chemical vapor deposition or sol-gel formation. Generally, these materials are formed so as to have a degree of porosity to allow free movement of the fast ion therethrough.

The ion conductive material may alternatively be a gel such as, for example, an organic resin. Suitable organic materials include, but are not necessarily limited to, a copolymer of hydroxyethyl methacrylate and 2-acrylamide-2-methylpropane sulfonic acid, melamine resin, silicone resin, xylene resin, vinyl acetate resin, a copolymer of vinyl chloride and vinyl acetate, polycarbonate resin, a resin of a cellulosic derivative, polyvinyl carbazole resin, polyethylene oxide resin, polypropylene oxide resin, polyacrylonitrile resin, polymethacrylonitrile resin, and polyvinylidene fluoride resin, as well as mixtures, copolymers, and derivatives thereof. Gel electrolytes are preferred in this invention because they provide a faster response time for the first metal layer dissolution and re-deposition.

The preferred ion conductive material is one having good adhesive properties, and which is a gel made of a polymer such as, for example, polyvinyl butyral resin, polyvinyl alcohol resin, polyacrylic acid resin, or polyvinyl acetate resin, as well as mixtures, Copolymers, and derivatives thereof. Polyvinyl butyral resin is a particularly preferred ion conductive material, in view of its weatherability and adhesiveness.

The electrolyte of the fast ion conductor layer is dissolved or dispersed substantially uniformly throughout the gel or solid ion conductive material, respectively. Cations of a second metal (which may be the same as the first metal) are thereby provided throughout the ion conductive layer matrix. Useful electrolytes include, but are not necessarily limited to, anion-cation pairs, wherein the cation is selected from cations such as $Li^+$, $Na^+$, $K^+$, $Cs^+$, $Mg^{++}$, $(CH_3)_4N^+$, $Ag^+$, $Cu^+$, $(C_2H_5)_4N^+$, $(C_3H_7)_4N^+$, $(C_4H_9)_4N^+$, etc., and the anion is selected from anions such as $BF_4^-$, $ClO_4^-$, $I^-$, $Br^-$, $NO_3^-$, $PF_6^-$, $AsF_6^-$, $CF_3SO_2^-$, $Cl^-$, and the like, as well as mixtures thereof. The amount of electrolyte to be employed in the fast ion conductor layer depends upon various factors, including the particular cation-anion pair chosen, the switching rate desired, etc. Selection of the preferred electrolyte as well as its concentration in the fast ion conductor layer will be apparent to one ordinarily skilled in the art in view of the present disclosure. Particularly preferred electrolytes are lithium tetrafluoroborate and lithium perchlorate, as well as mixtures thereof.

Conventional methods may be used to form the fast ion conductor layer having a normalized concentration of electrolyte dispersed throughout the ion conductive material matrix. For example, when starting with a solid ion conductive material powder and solid electrolyte powder, the components may be thoroughly admixed with a common solvent such as, for example, a lower alkyl alcohol, dried, and compressed between the first metal layer and ion storage layer to form and adhere thereto the fast ion conductive layer. An alternative method is to codeposit a solid ion conductive material and an electrolyte by conventional deposition methods such as, for example, vacuum evaporation or chemical vapor deposition, directly onto the first metal layer. Yet another method for forming the fast ion conductor layer utilizing a solid ion conductive material is by the well known sol-gel process, wherein a conductive substrate having a first metal layer deposited thereon is dipped into a solution of an electrolyte in an ion conductive material forming precursor, withdrawn at a specified rate to form a gel fast ion conductor layer on the first metal layer, then dried and consolidated. A gel based fast ion conducting layer may be prepared by thoroughly admixing the organic material and electrolyte and casting a layer of the mixture onto the first metal layer, or by injecting the mixture between and adhering it to the first metal layer and the transition metal compound ion storage layer. Selection of the preferred method for forming the fast ion conducting layer, including other methods not specifically recited herein, will be apparent to those ordinarily skilled in the art in view of the present disclosure.

Typically, the thickness of the fast ion conductor layer ranges from about 1,000 Angstroms to about 5 mm., depending upon the starting materials for the fast ion conductor and its desired performance. Since a small potential will provide an enormous field strength, thinner films are generally preferred over thicker ones. Where the fast ion conductor is a solid, a preferred thickness range is from about 1,000 Angstroms to about 1 mm. Where the fast ion conductor is a gel, a preferred thickness range is from about 0.5 mm. to about 5 mm. Another important factor for determining the thickness of the fast ion conductor layer is the thickness of the persistent first metal layer and whether the ultimately produced laminate is intended to operate so as to cause the first metal layer to completely or only partially dissolve into the fast ion conductor layer.

The transition metal compound ion storage layer may comprise any of the transition metal compounds known in the art as useful for the transport and storage of ions including, but necessarily limited to, transition metal oxides, sulfides, oxysulfides, selenides, tellurides, chromates, molybdates, tungstates, vanadates, niobates, tantalates, titanates, stanates, and the like, as well as mixtures thereof. Contemplated transition metals include, but are not necessarily limited to, tungsten, titanium, vandaium, chromium, manganese, cobalt, nickel, copper, yttrium, niobium, molybdenum, silver, cerium, hafnium, tantalum, etc. Preferred transition metal compound ion storage layers include $TiO_2$, $V_2O_5$, $Mn_2O_3$, $WO_3$, $CeO_2$, and $CeO_2-TiO_2$. The thickness of the ion storage layer may vary over wide limits from about 100 Angstroms to about 10,000 Angstroms, depending upon the particular transition metal compound chosen, the nature of the fast ion, and the number of fast ions which are to be accommodated in the ion storage layer. Such transition metal compound layers may be prepared by the conventional methods mentioned hereinabove such as, for example, sputtering, reactive sputtering, pyrolysis, chemical vapor deposition, sol-gel deposition, and the like. Conventionally, where the fast ion conductor layer is a solid, the ion storage layer may be deposited directly onto and adhered to the fast ion conductor layer. Where the fast ion conductor layer is a gel which has been cast onto the first metal layer, the ion storage layer may be formed independently, e.g., by deposition onto an electrode, and thereafter mechanically adhered to the fast ion conductor layer by pressing thereagainst.

The laminate further comprises an electrode adjacent and adhered to the ion storage layer. Such an electrode may comprise, for example, one or more Dag contacts applied to the surface of the ion storage layer, or a second conductive substrate (as defined hereinabove) adhered to the surface of the ion storage layer opposite the fast ion conductor layer.

Thus, an electromagnetic radiation modulating laminate may be prepared comprising consecutively a conductive substrate, a persistent first metal layer, a fast ion conductor layer, a transition metal compound ion storage layer and an electrode.

In operation, a positive electrical potential is applied to the laminate conductive substrate and a negative electrical potential is applied to the electrode. This causes atoms at the surface of the first metal layer to be converted into cations which migrate into the interfacial region of the fast ion conductor. The fast ion conductor containing the first metal cations is substantially transparent. Simultaneously, fast second metal ions from the fast ion conductor layer migrate into the transition metal compound ion storage layer. The electrical potential may be applied for a period of time sufficient to completely dissolve the first metal layer, or the potential may be removed at an earlier time thereby leaving a portion of the first metal layer between the conductive substrate and the fast ion conductor layer. The polarity of the electrical potential may be reversed to re-deposit the first metal layer between the conductive substrate and the fast ion conductor layer.

In this fashion, the laminate may function as a device for modulating the transmission and reflection of electromagnetic radiation, e.g., infrared radiation and visible light rays, directed thereagainst. Such a device is commonly referred to in the art as a "light valve." The thickness of the first metal layer may be determined, based upon the desired maximum reflectivity (or minimum transmissivity) desired for the ultimately produced device.

The laminate can be constructed so as to operate between extreme ranges, from totally opaque to substantially transparent. For example, where cerium oxide or a mixture of cerium oxide and titanium dioxide is used as the transition metal compound ion storage layer, the migration of fast ions into the ion storage layer does not cause it to change color; the cerium oxide or mixture of cerium oxide and titanium dioxide remains neutral transparent. However, where the transition metal compound ion storage layer comprises, for example, vanadium oxide, the migration of lithium cations into the ion storage layer causes it to turn blue. Thus, the extreme states for such a device having a vanadium oxide ion storage layer range from totally opaque to blue transparent. As is readily apparent to one ordinarily skilled in the art, a great variety of electromagnetic radiation wavelength bandwidth transmissivities and reflectivities, as well as perceived colors, are obtainable by varying the materials of construction and thicknesses for each of the layers of the electromagnetic radiation modulating laminate utilizing no more than routine experimentation.

Generally, where the electromagnetic radiation modulating laminate of the present invention is employed in a light valve, the conductive substrate and electrode must both be substantially transparent. During operation, means for supplying an electrical potential, such as a battery and associated electrical leads, is used to apply a voltage across the conductive substrate and electrode. The light valve thereby may be reversably switched between its opaque and transmissive states by applying voltages in the range from about 2 volts to about −2 volts. Such light valves are typically operated using low voltages, and can provide suitable visual contrasts with an electron transfer of only several millicoulombs of electrical charge per square centimeter of laminate area. Switching from transmissive to reflective is easily accomplished by polarity changes or voltage sweeps.

EXAMPLE

A conductive substrate is prepared by pyrolytically depositing a layer of fluorine-doped tin oxide about 2,000 Angstroms thick onto a sheet of sode-lime-silica glass. A persistent first metal layer of copper about 450 Angstroms thick is deposited by thermal evaporation over the fluorine-doped tin oxide layer of the conductive substrate. An electrode is prepared in the same manner as the conductive substrate above, by pyrolytically depositing a layer of fluorine-doped tin oxide about 2,000 Angstroms thick onto a sheet of soda-lime-silica glass. A transition metal compound ion storage layer of tungsten trioxide about 2,000 Angstroms thick is pyrolytically deposited onto the fluorine-doped tin oxide layer of the electrode. Finally, the first metal layer of the conductive substrate and the transition metal compound ion storage layer of the electrode are superposed, and a fast ion conductor layer is injected therebetween. The fast ion conductor layer material comprises a polyvinyl butyral resin doped with lithium perchlorate to give a conductivity of about $10^{-4}$ $(ohm.cm)^{-1}$. The electromagnetic radiation modulating laminate so constructed has an Illuminant A transmissivity of about 2%.

An electrical potential of about two volts is applied to the laminate; the negative potential to the electrode, and the positive potential to the conductive substrate. The laminate bleaches to a transmissivity of about 65% in about 150 seconds. When the polarity of the applied electrical potential is reversed, the transmissivity of the laminate reverts to about 2%.

It is observed that any established level of transmissivity between about 2% and about 65% remains fixed over time when the electrical potential is removed.

This example may be repeated with similar success by substituting the generically or specifically described reactants and/or reaction conditions recited herein for those actually used in the preceding example.

From the foregoing description, one ordinarily skilled in the art can easily ascertain the essential characteristics of this invention, and without departing from its spirit and scope, can make various changes and modifications in the invention to adapt it to various usages and conditions.

What is claimed is:

1. An electromagnetic radiation modulating laminate, comprising:
   A) a conductive substrate;
   B) a persistent first metal layer adhered to the conductive substrate;
   C) a fast ion conductor layer, containing fast ions of a second metal, adhered to the first metal layer;
   D) a transition metal compound ion storage layer adhered to the fast ion conductor layer; and
   E) an electrode adhered to the ion storage layer.

2. The electromagnetic radiation modulating laminate according to claim 1, wherein the conductive substrate comprises a glass support having at least one layer comprising a metal oxide thereon from about 100 Angstroms to about 50,000 Angstroms thick.

3. The electromagnetic radiation modulating laminate according to claim 2, wherein the metal oxide comprises fluorine-doped tin oxide.

4. The electromagnetic radiation modulating laminate according to claim 2, wherein the conductive substrate is substantially transparent.

5. The electromagnetic radiation modulating laminate according to claim 1, wherein the first metal layer is from about 50 Angstroms to about 500 Angstroms thick.

6. The electromagnetic radiation modulating laminate according to claim 1, wherein the fast ion conductor layer comprises a gel ion conductive material.

7. The electromagnetic radiation modulating laminate according to claim 1, wherein the fast ion conductor layer comprises an electrolyte selected from the group consisting of lithium tetrafluoroborate and lithium perchlorate.

8. The electromagnetic radiation modulating laminate according to claim 1, wherein the transition metal compound ion storage layer comprises an oxide selected from the group consisting of $TiO_2$, $WO_3$, $V_2O_5$, $Mn_2O_3$, $CeO_2$, and $CeO_2$—$TiO_2$.

9. The electromagnetic radiation modulating laminate according to claim 1, wherein the electrode comprises a glass support having at least one layer comprising a metal oxide thereon from about 100 Angstroms to about 50,000 Angstroms thick.

10. In an automotive glazing, the improvement wherein said glazing includes the electromagnetic radiation modulating laminate of claim 1.

11. In an automotive glazing, the improvement wherein said glazing includes the electromagnetic radiation modulating laminate of claim 1.

12. An electromagnetic radiation modulating laminate, comprising:
    A) a conductive substrate including a glass support having at least one layer comprising a metal oxide thereon from about 1,000 Angstroms to about 20,000 Angstroms thick;
    B) a persistent first metal layer, from about 50 Angstroms to about 500 Angstroms thick, adhered to the conductive substrate;
    C) a fast ion conductor layer, containing lithium cations, adhered to the first metal layer;
    D) a transition metal compound ion storage layer, comprising an oxide selected from the group consisting of $TiO_2$, $WO_3$, $V_2O_5$, $Mn_2O_3$, $CeO_2$, and $CeO_2$—$TiO_2$, adhered to the fast ion conductor layer; and
    E) an electrode, including a glass support having at least one layer comprising a metal oxide thereon from about 1,000 Angstroms to about 20,000 Angstroms thick, adhered to the ion storage layer.

13. A process for preparing an electromagnetic radiation modulating laminate, comprising the steps of:
    A) providing a conductive substrate;
    B) adhering a persistent first metal layer to the conductive substrate;
    C) adhering a fast ion conductor layer, containing fast ions of a second metal, to the first metal layer;
    D) adhering a transition metal compound ion storage layer to the fast ion conductor layer; and
    E) adhering an electrode to the ion storage layer.

14. The process for preparing an electromagnetic radiation modulating laminate according to claim 13, wherein the conductive substrate comprises a glass support having at least one layer comprising a metal oxide thereon from about 100 Angstroms to about 50,000 Angstroms thick.

15. The process for preparing an electromagnetic radiation modulating laminate according to claim 14, wherein the metal oxide comprises fluorine-doped tin oxide.

16. The process for preparing an electromagnetic radiation modulating laminate according to claim 14, wherein the conductive substrate is substantially transparent.

17. The process for preparing an electromagnetic radiation modulating laminate according to claim 13, wherein the first metal layer is from about 50 Angstroms to about 500 Angstroms thick.

18. The process for preparing an electromagnetic radiation modulating laminate according to claim 13, wherein the fast ion conductor layer comprises a gel ion conductive material.

19. The process for preparing an electromagnetic radiation modulating laminate according to claim 13, wherein the fast ion conductor layer comprises an electrolyte selected from the group consisting of lithium tetrafluoroborate and lithium perchlorate.

20. The process for preparing an electromagnetic radiation modulating laminate according to claim 13, wherein the transition metal compound ion storage layer comprises an oxide selected from the group consisting of $TiO_2$, $WO_3$, $V_2O_5$, $Mn_2O_3$, $CeO_2$, and $CeO_2$—$TiO_2$.

21. The process for preparing an electromagnetic radiation modulating laminate according to claim 13, wherein the electrode comprises a glass support having at least one layer comprising a metal oxide thereon from about 100 Angstroms to about 50,000 Angstroms thick.

22. A process for preparing an electromagnetic radiation modulating laminate, comprising the steps of:
   A) providing a conductive substrate, including a glass support having at least one layer comprising a metal oxide thereon from about 1,000 Angstroms to about 20,000 Angstroms thick;
   B) adhering a persistent first metal layer, from about 50 Angstroms to about 500 Angstroms thick, to the conductive substrate;
   C) adhering a fast ion conductor layer, containing lithium cations, to the first metal layer;
   D) adhering a transition metal compound ion storage layer, comprising an oxide selected from the group consisting of $TiO_2$, $WO_3$, $V_2O_5$, $Mn_2O_3$, $CeO_2$, and $CeO_2$—$TiO_2$, to the fast ion conductor layer; and
   E) adhering an electrode, including a glass support having at least one layer comprising a metal oxide thereon from about 1,000 Angstroms to about 20,000 Angstroms thick, to the ion storage layer.

23. A process for modulating the transmission and reflection of electromagnetic radiation, comprising the steps of:
   A) providing an electromagnetic radiation modulating laminate, comprising:
      i) a conductive substrate;
      ii) a persistent first metal layer adhered to the conductive substrate;
      iii) a fast ion conductor layer, containing fast ions of a second metal, adhered to the first metal layer;
      iv) a transition metal compound ion storage layer adhered to the fast ion conductor layer; and
      v) an electrode adhered to the ion storage layer;
   B) directing electromagnetic radiation against the laminate; and
   C) applying a polarity-reversible electrical potential across the conductive substrate and the electrode, to reversibly dissolve at least a portion of the first metal layer into the fast ion conductor layer.

24. A process for modulating the transmission and reflection of electromagnetic radiation, comprising the steps of:
   A) providing an electromagnetic radiation modulating laminate, comprising:
      i) a conductive substrate including a glass support having at least one layer comprising a metal oxide thereon from about 1,000 Angstroms to about 20,000 Angstroms thick;
      ii) a persistent first metal layer, from about 50 Angstroms to about 500 Angstroms thick, adhered to the conductive substrate;
      iii) a fast ion conductor layer, containing lithium cations, adhered to the first metal layer;
      iv) a transition metal compound ion storage layer, comprising an oxide selected from the group consisting of $TiO_2$, $WO_3$, $V_2O_5$, $Mn_2O_3$, $CeO_2$, and $CeO_2$—$TiO_2$, adhered to the fast ion conductor layer; and
      v) an electrode, including a glass support having at least one layer comprising a metal oxide thereon from about 1,000 Angstroms to about 20,000 Angstroms thick, adhered to the ion storage layer;
   B) directing electromagnetic radiation against the laminate; and
   C) applying a polarity-reversible electrical potential across the conductive substrate and the electrode, to reversibly dissolve at least a portion of the first metal layer into the fast ion conductor layer.

* * * * *